(No Model.)
R. E. McCONLEY.
NUT LOCK.
No. 536,934.
Patented Apr. 2, 1895.
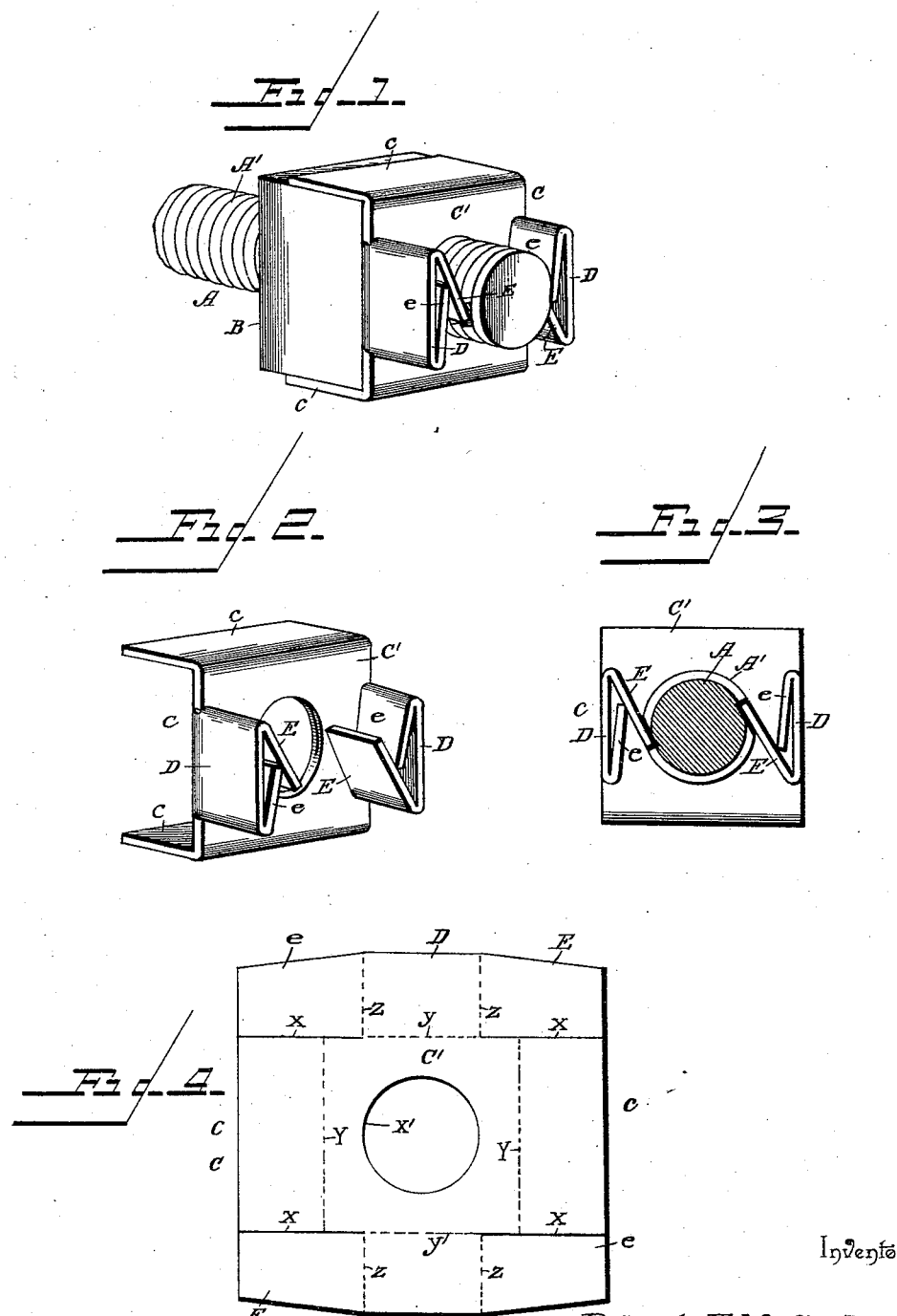
Witnesses
Thos. W. Riley.
R. M. Smith.
Inventor
Robert E. McConley.
By his Attorneys.
C. A. Snow & Co.

UNITED STATES PATENT OFFICE.

ROBERT E. McCONLEY, OF WHITCOMB, WISCONSIN.

NUT-LOCK.

SPECIFICATION forming part of Letters Patent No. 536,934, dated April 2, 1895.

Application filed February 7, 1895. Serial No. 537,644. (No model.)

*To all whom it may concern:*

Be it known that I, ROBERT E. McCONLEY, a citizen of the United States, residing at Whitcomb, in the county of Shawano and State of Wisconsin, have invented a new and useful Nut-Lock, of which the following is a specification.

My invention relates to an improvement in nut-locks, or devices, employed for the purpose of preventing the escape of a nut from a bolt, or threaded shank, it frequently happening that, on account of the jarring and vibration of machinery, nuts are often displaced, sometimes causing serious results and damage to the machinery.

My invention consists in making a nut-lock from a single piece of spring steel, which, when properly cut and bent into completed form, shall comprise a main body portion, nut-engaging flanges, spring-jaws, or pawls, for engaging the threaded shank of the bolt, or other article to which the nut is to be applied, and springs for holding said jaws into close engagement with the threaded shank, all of said parts being formed from a single piece of material.

In the accompanying drawings,—Figure 1 is a perspective view of a threaded shank and nut, with my improved nut-lock applied thereto. Fig. 2 is a perspective view of a nut-lock, detached. Fig. 3 is a face view of a nut and nut-lock, with the threaded shank in section. Fig. 4 is a detail view of the nut-lock blank, showing the form of the piece of metal from which the nut lock is made, and the manner of cutting and scoring said blank, preparatory to bending and shaping the same into a complete and operative device.

Similar letters of reference indicate corresponding parts in all the figures of the drawings.

A indicates a bolt or rod having a screw-threaded portion A', and B, indicates the nut applied thereto.

C, represents a nut-lock, composed of a main, or body, portion C', having a central perforation therein for the passage of the threaded shank of the bolt, or rod.

c, c are inwardly turned flanges formed in one piece with the main body portion, and bent at right angles thereto for the purpose of embracing the threaded nut upon two opposite sides. The width of these flanges c, c, is immaterial, but I prefer to make them equal to, or slightly greater than, half the thickness of the nut, in order to obtain a firm grip thereon.

D, D, indicate outwardly extending flanges, or supports, for the spring-actuated pawls, and the springs for actuating the latter.

E, E indicate two spring pawls, or lips, formed integrally with the other parts, already described, and extending inwardly toward the perforation in the body portion where they are adapted to engage suitable scores, or indentations, in the threaded shank of the bolt, or rod, as clearly shown in the drawings.

e, e, represent two flat springs made from the same material and same piece as the other parts, heretofore described, and lying behind the spring pawls, or lips, and pressing the same inward into a more forcible engagement with the threaded shank, referred to.

By reference to Fig. 4, it will be seen that my improved nut-lock is formed from a single piece of sheet steel, it being necessary to make only four slits x, therein, and to provide the central opening x', for the passage of the threaded shank. The blank is bent on the lines Y, Y, to form the flanges engaging the sides of the nut, and at y y, in an opposite direction to form the outwardly extending flanges, or supports, for the pawls and springs. Other bends are made on the lines z, z, to form the inwardly-extending spring-pawls, or lips, and the springs for pressing the latter inward.

Thus, it will be seen, a complete nut-lock is formed from a single piece of sheet steel, stamped out in the manner indicated, and bent as indicated in the drawings. This makes a simple, cheap and durable nut-lock, which can be easily and quickly applied.

Having described my invention, I claim—

In a nut-lock, a perforated plate adapted to stride a threaded bolt, the inwardly turned flanges for embracing the sides of the nut, the upturned outwardly extending side flanges projecting from the face of the perforated plate-portion, inclined arms or pawls extending inwardly from and formed integrally with the outwardly extending flanges, and the springs also formed integrally with the outwardly extending flanges, and pressing against the pawls for forcing the latter into engagement with the threaded shank or bolt, substantially as described.

In testimony that I claim the foregoing as my own I have hereto affixed my signature in the presence of two witnesses.

ROBERT E. McCONLEY.

Witnesses:
HUGH O'KEER,
WM. HEINS.